March 28, 1967 D. H. SHEFFIELD 3,311,874
METHODS AND APPARATUS FOR TRANSLATING SEISMIC FIELD
DATA TO A SEISMIC SECTION
Filed June 29, 1964 6 Sheets-Sheet 1

FIELD TAPE

TRANSFER TAPE

SEISMIC
SECTION

DONALD H. SHEFFIELD
INVENTOR.

BY *William Scherback*

ATTORNEY

DONALD H. SHEFFIELD
INVENTOR.

DONALD H. SHEFFIELD
INVENTOR.

DONALD H. SHEFFIELD
INVENTOR.

DONALD H. SHEFFIELD
INVENTOR.

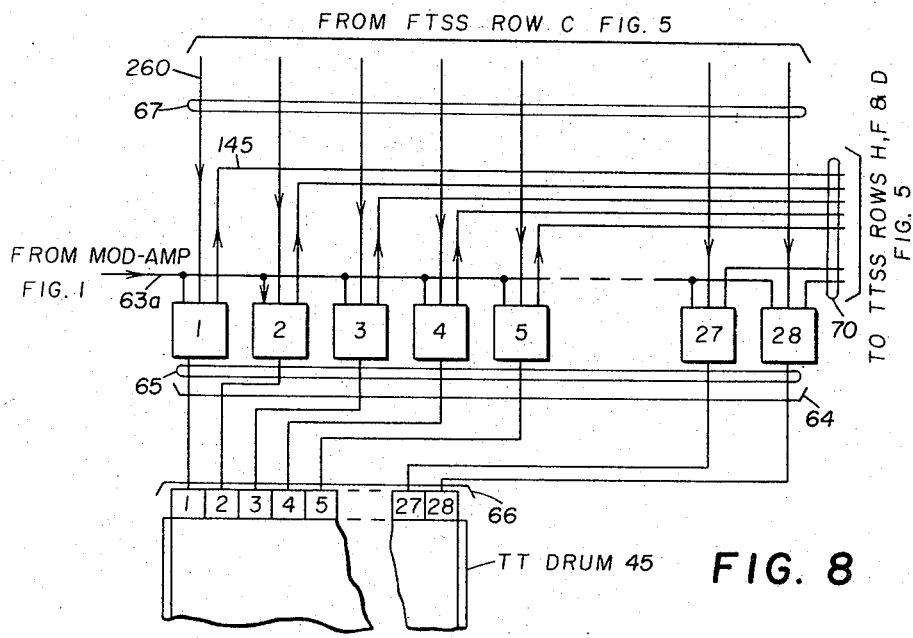
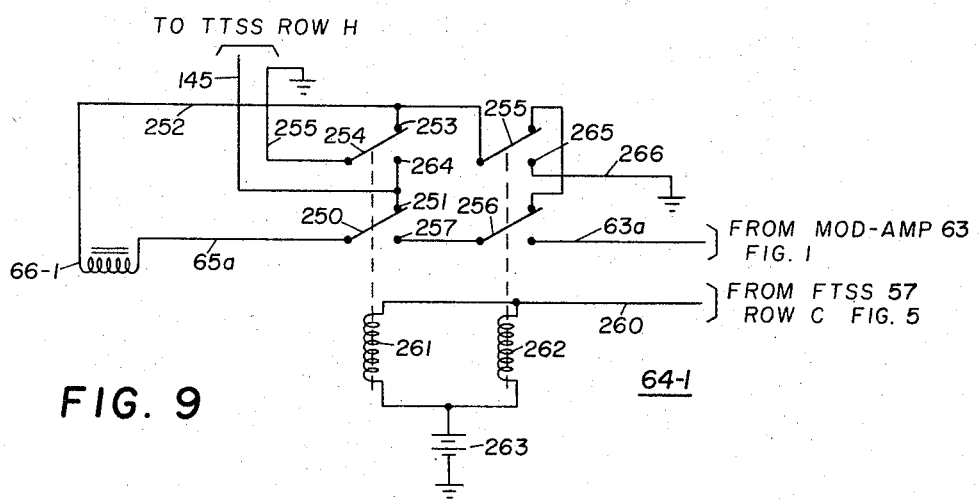
DONALD H. SHEFFIELD
INVENTOR.

_United States Patent Office_   3,311,874
Patented Mar. 28, 1967

3,311,874
METHODS AND APPARATUS FOR TRANSLATING SEISMIC FIELD DATA TO A SEISMIC SECTION
Donald H. Sheffield, Farmers Branch, Tex., assignor to Mobil Oil Corporation, a corporation of New York
Filed June 29, 1964, Ser. No. 378,741
12 Claims. (Cl. 340—15.5)

This invention relates to methods of and apparatus for processing seismic data originally recorded on field tapes into various formats, including visual seismic sections, and has for an object materially decreasing the time involved in data processing by performing simultaneously steps heretofore performed sequentially.

At the present time and generally in the art of seismic data processing, it is customary to transform field tape information to a presentation known as a seismic section. The prior art method is as follows. Magnetic field tapes, each comprised of a plurality of seismic traces and associated reference information traces, are played back for the purpose of time correction such, for example, as static time correction and dynamic or normal movement correction to the seismic traces. The time-corrected seismic traces are recorded on a second magnetic tape, referred to as a transfer tape. This transfer tape is in turn employed in the making of a seismic section wherein selected time-corrected seismic traces are combined or mixed in various predetermined proportions of amplitude and number.

The process of the prior art requires that a complete transfer tape be made before the seismic section can be written or made. Thus, the sequence of operation may be summed as follows. The field tape is played back and each seismic trace sequentially time corrected and re-recorded on a transfer tape. When all the seismic traces, usually 24 in number, have been time corrected and the transfer tape completed with additional information traces, the playback system is employed to play back the time-corrected traces on the transfer tape in the writing of the seismic section. In a typical example, three of the time-corrected traces are played back simultaneously, mixed and written as a single trace on the seismic section. For example, traces 1, 1, and 2 on the transfer tape are mixed and appear as trace 1 on the section, then traces 1, 2, and 3 on the transfer tape are mixed and appear as trace 2 on the seismic section, etc.

In accordance with the present invention, the time involved in time correcting the field tape and writing the seismic section is essentially halved by way of a method which results in the simultaneous completion of the transfer tape and the seismic section. A procedure, which will be referred to as "delayed mix," enables an operator to reproduce selected traces from the transfer tape during the course of recording other traces on the same and to make the seismic section during the course off such reproduction and recording.

More particularly, there is provided a method of processing seismic data recorded as traces in phonographically reproducible form to produce a time-corrected representation thereof and simultaneously to produce a second representation differing in character from the time-corrected representation. To do so, each seismic trace sequentially is reproduced and time corrected for static and dynamic time errors. Each time-corrected trace is re-recorded sequentially. While re-recording sequentially, at least one selected previously re-recorded trace is reproduced and modified in character. The modified trace is then recorded on another medium to produce a portion of a seismic section while the re-recording is continued.

A playback—re-recording system for carrying out the method of the invention requires precise synchronized relationships be maintained between means for selecting field traces, the means for time corrections and the means for selecting traces from the transfer tape. To this end there is provided an interlock system which interrupts the system whenever synchronism is lost.

In another aspect of this invention, the system is provided with means to delay the reproduction of traces from the transfer tape while maintaining the interlock feature fully effective and during this interval muting the seismic section writer.

In yet another aspect of the present invention, an operator may start the reproduction of time-corrected seismic traces on any selected trace while maintaining the muting feature intact until such time as the selected trace is to be reproduced.

For other features and attendant advantages, reference will now be made to the following detailed description taken in conjunction with the accompanying drawings wherein.

Figure 1:
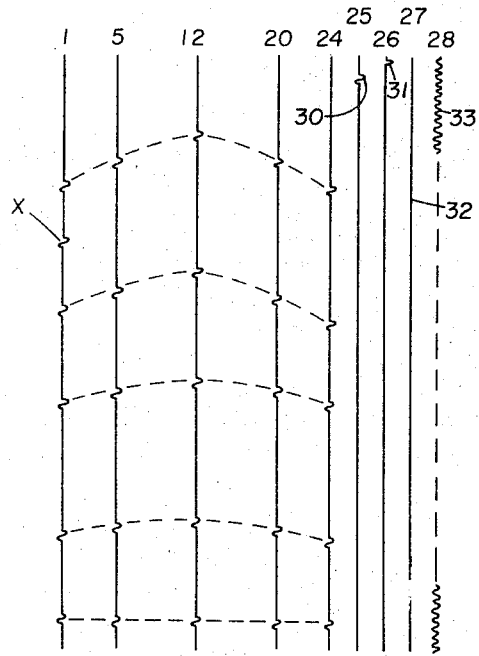
FIGURE 1 is an idealized representation of the traces comprising a field seismogram illustrating dynamic time error.
Figure 5:
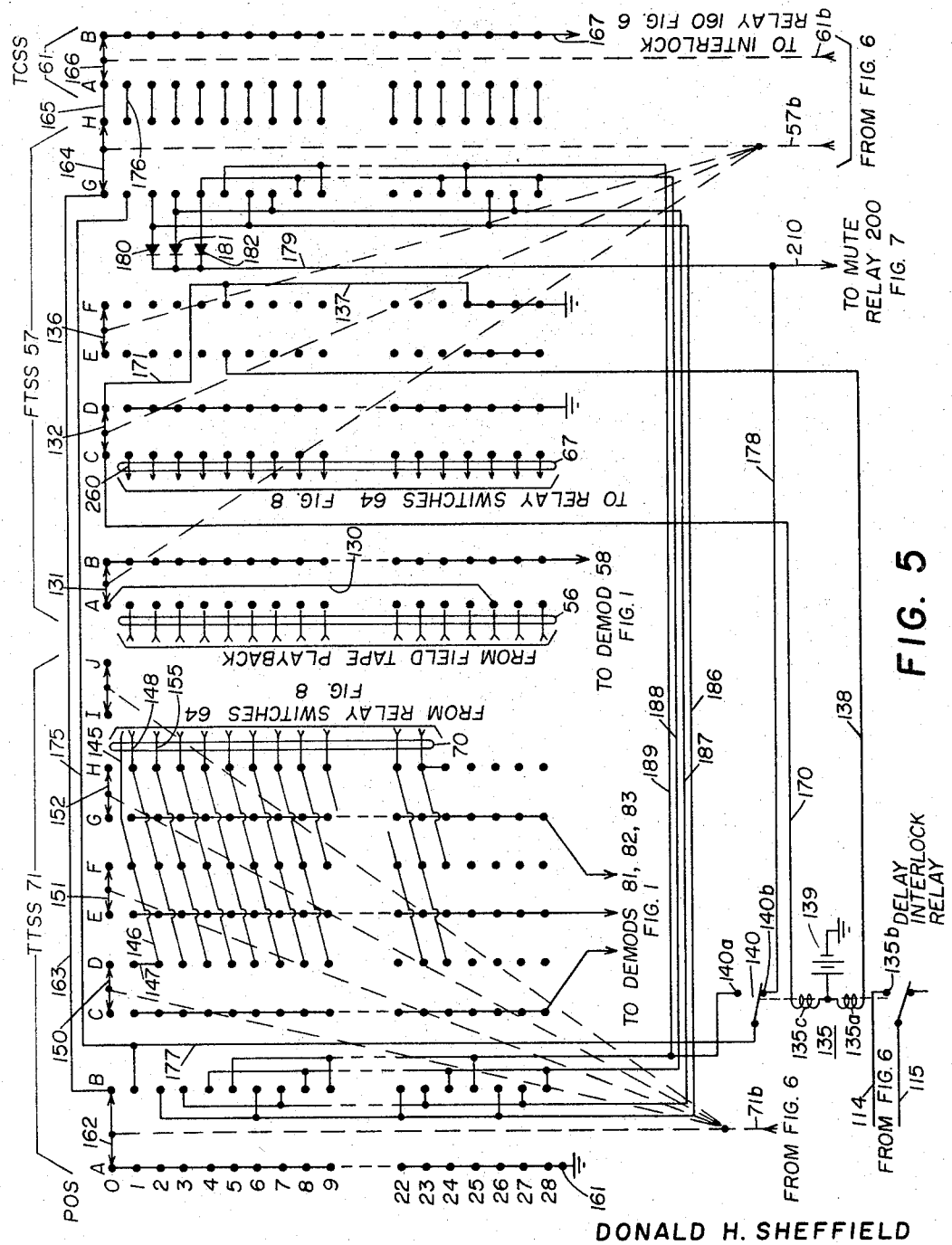
FIGURE 5 is a wiring diagram of the selector switches employed in the practice of the present invention.
Figure 6:
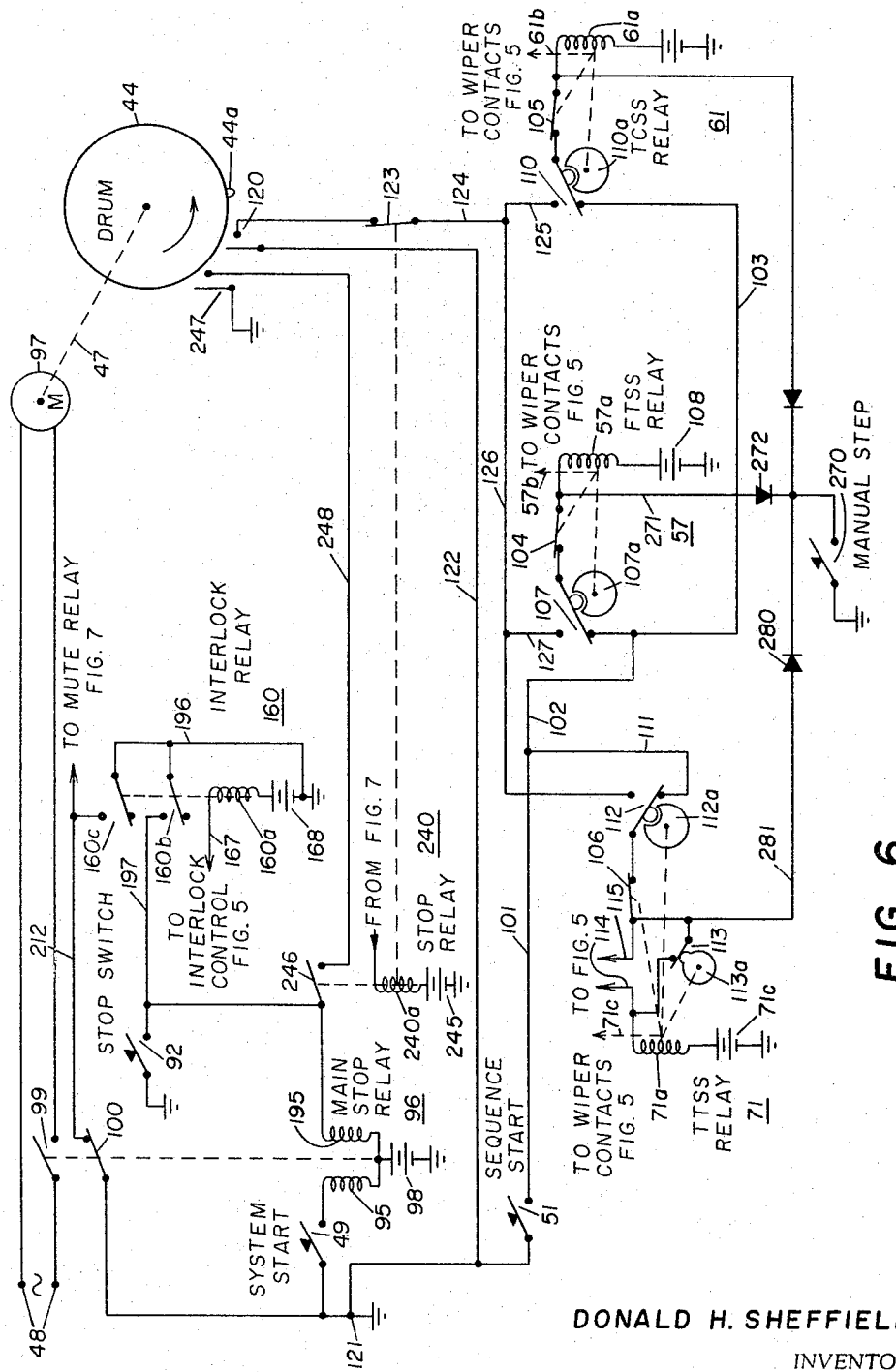
Figure 7:
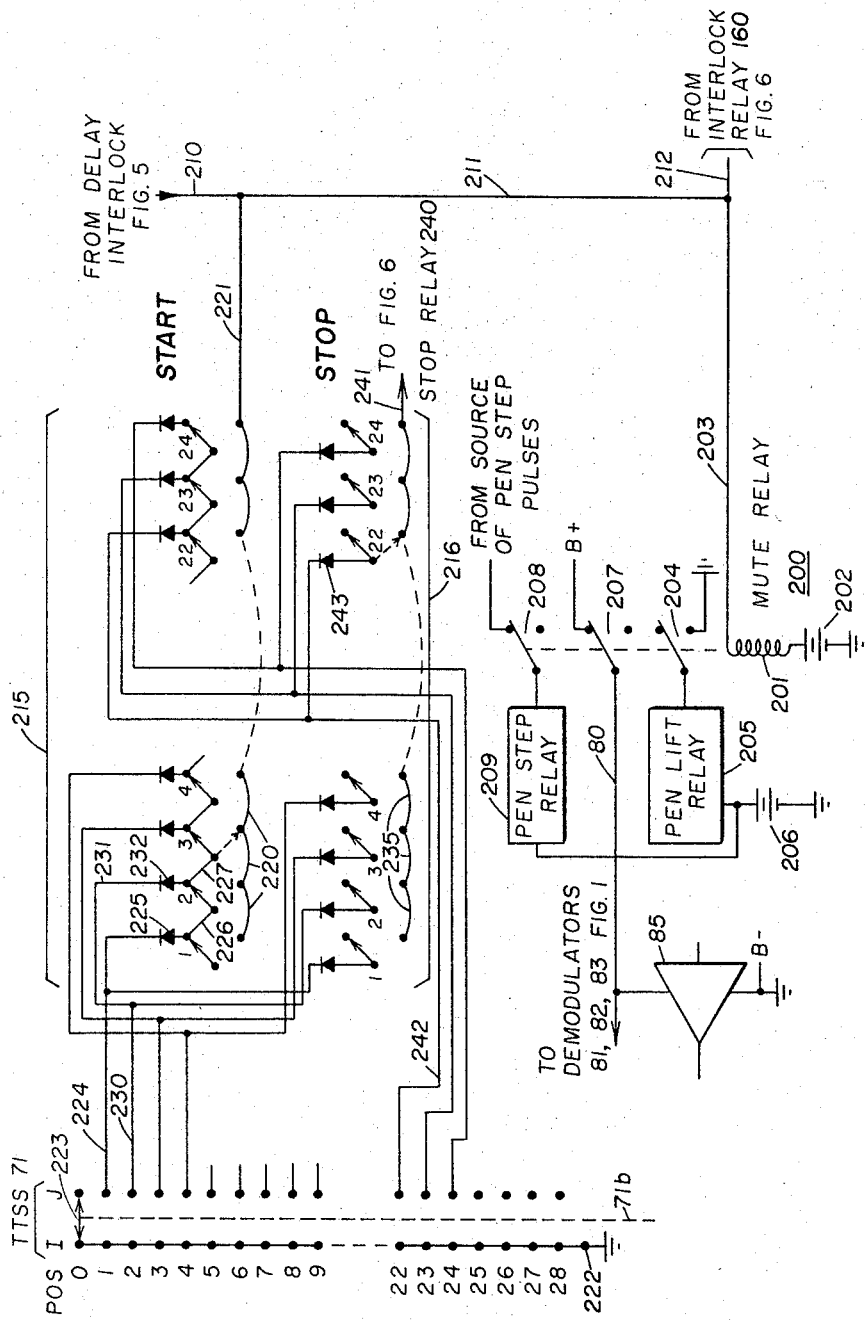

FIGURE 6 schematically illustrates elements which in conjunction with the selector switches of FIGURE 5 carry out various features of the present invention;

FIGURE 7 schematically illustrates an arrangement for selective starting and stopping of the system of FIGURE 1 and also includes an illustration of the muting feature;

FIGURE 8 illustrates the relationship between the record-playback relays and the record-playback heads associated with the transfer tape mechanism; and FIGURE 9 is a detailed schematic of one of the relay switches of FIGURE 8.

Figure 2:
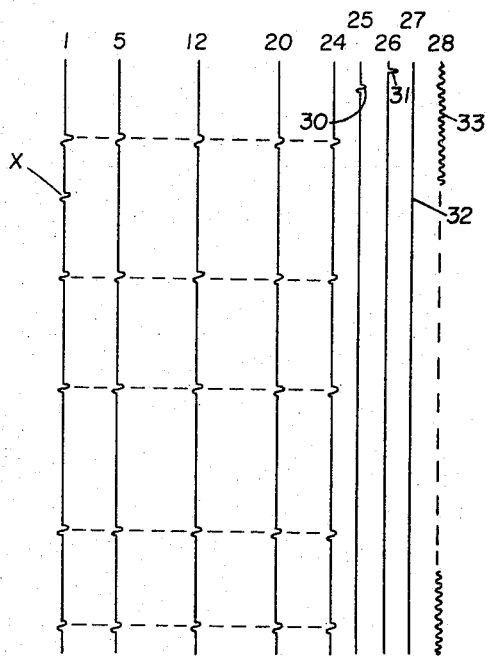
FIGURE 2 is an idealized representation of the seismic information contained on a transfer tape after time corrections have been made to the field data illustrated in FIGURE 1.
Figure 3:
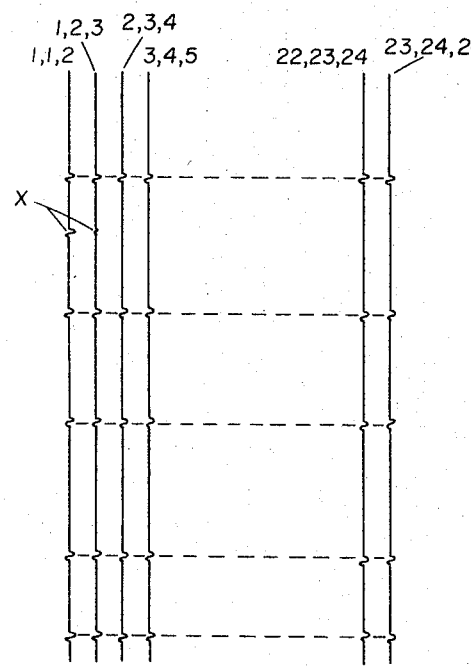
FIGURE 3 is an idealized representation of a seismic section produced from the information contained on the transfer tape of FIGURE 2 wherein selected seismic traces have been combined by way of a ⅔ mix.

The understanding of the present invention will be aided by reference now to FIGURES 1, 2 and 3 which represent, respectively, a typical field tape, a transfer tape, and a portion of a seismic section. In the description to follow, the reference characters 1–28 will be used to relate the various elements, switch positions, relays and traces to the 28 traces of a typical field seismogram. The typical field tape of FIGURE 1 includes 28 traces. These comprise 24 seismic traces identified as traces 1–24 and four reference information traces 25–28. Trace 25 includes an uphole signal 30, the signal detected by a geophone close to the shotpoint and utilized for static corrections, and trace 26 includes a time break signal 31, the signal representing the time at which seismic energy is generated. Trace 27 includes a noise-canceling signal 32 which is a 4000-cycle tone employed to detect "wow" in the recording or playback drums and to correct for any noise introduced by such "wow." Trace 28 includes a 100-cycle timing signal 33 as a reference time scale and is used to indicate the time scale against which the original field data was recorded.

The traces 1–24 of FIGURE 1 are shown in a time relationship which results from employing a split spread of geophones. This time relationship is a dynamic time error, sometimes referred to as normal moveout. Such error must be corrected, as well as static errors, prior to recording of a seismic section. Accordingly, the seismic traces 1–24 are time corrected, both statically and dynamically, usually one at a time, and re-recorded on a transfer tape as shown in FIGURE 2. The information on traces 25–28 is also re-recorded on the transfer tape but is not affected by static and dynamic time correction. It will be observed that the various reflections comprising the traces 1–24 are essentially in line, indicating zero dip and that static and dynamic time correction has been effected.

In accordance with the present invention, the seismic section of FIGURE 3 is written at the same time the transfer tape of FIGURE 2 is being prepared. The operation is as follows. Traces 1–24 of the field tape sequentially are played back, time corrected, and recorded, respectively, as traces 1–24 on a transfer tape. After a predetermined number of traces have been recorded on the transfer tape and while an additional trace is being recorded, a previously recorded trace or traces is played back, modified in character, and recorded as the first trace on another medium. This sequential operation continues until at the very end wherein reference information trace 28 is being recorded on the transfer tape, the last seismic trace on the transfer tape is being played back, modified and recorded on the seismic section. Accordingly, at the moment the transfer tape has been completed, the segment of the seismic section representing the seismic information on the transfer tape has also been written. The concurrent operation of recording a transfer tape while writing the seismic information from this tape leads to considerable savings in machine time, resulting in an effective doubling of the capacity of any given playback machine.

In the example illustrated, the modification in character of the seismic signals or traces on the transfer tape takes the form of a mixing or compositing operation. Specifically, it is a ⅔ mix. To illustrate the effect of a mixing operation, there has been included in trace 1, FIGURE 1, a reflection identified by the reference character X. The reflection X also appears without modification of amplitude in trace 1 of FIGURE 2. However, in FIGURE 3, trace 1, the reflection X is only ⅔ the amplitude; in trace 2 it is only ⅓ the amplitude; and is absent in trace 3.

The method of the present invention as applied to a ⅔ mix involves the following specific relationship of steps. Traces 1–4 from the field tape are recorded sequentially after time correction on the transfer tape. As trace 5 is being recorded on the transfer tape, two representations of trace 1 and a single representation of trace 2 are produced, mixed together and recorded as the first trace 1, 1, 2 on the seismic section. Trace 6 is now recorded on the transfer tape and, while so doing, representations of traces 1, 2, and 3 are reproduced from the transfer tape, mixed and recorded as the second trace 1, 2, 3 on the seismic section. This procedure of record, reproduce, mix and record is repeated until as the final trace 28, the reference information trace including the 100-cycle signal, is being recorded on the transfer tape, a single representation of trace 23 and two representations of trace 24 are produced, mixed and recorded as the trace 23, 24, 24 on the seismic section.

Figure 4:
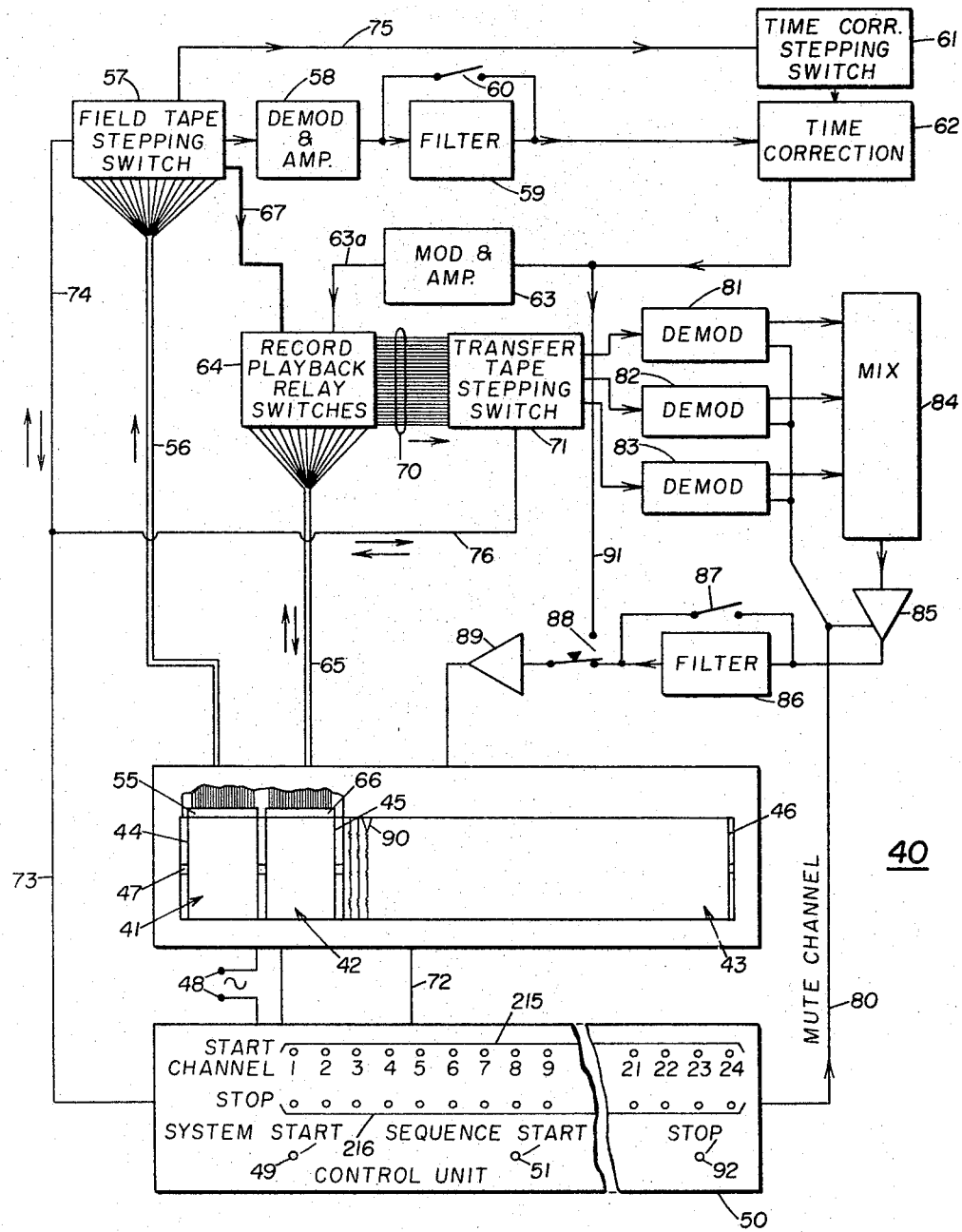
FIGURE 4 is a schematic representation, largely in block schematic form, of a data processing playback-recording system embodying the present invention.

The method described above may be carried out by a system 40 shown schematically in FIGURE 4. The processing system 40 includes a field tape playback unit 41, a transfer tape record and playback unit 42, and a section writing unit 43. As illustrated, these units include drums 44–46 which are preferably mounted on a common shaft 47 and driven by a constant speed motor (not shown). The field tape playback unit 41 has mounted thereon a magnetic tape upon which has been recorded the seismic and other information traces of FIGURE 1.

The recording medium on drum 45 is magnetic tape and the recording medium on drum 46 is paper. The system 40 is energized from a suitable source of power represented by terminals 48 by closure of system start switch 49 on the control unit 50. After the time break on the field tape has been aligned with a zero reference on the section writing medium, a sequence start switch 51 is closed to begin operations. The seismic traces on the field tape sequentially are played back by way of a plurality of playback heads 55 connected by way of individual conductors comprising the cable 56 through a selector switching unit 57, a field tape stepping switch.

Traces are then individually and sequentially demodulated, amplified, filtered if desired, and time corrected. Each trace is applied by way of a demodulator-amplifier 58 and either by way of filter 59 or filter bypass switch 60 to a time-correction unit 62. The time-correction selector switch 61, synchronized with selector switch 57, sequentially applies a preprogramed trace-correction signal to the time-correction unit 62 where each trace is statically and dynamically time corrected. The time-corrected traces are now modulated to an FM form by modulator-amplifier 63 to facilitate re-recording. This modulated signal for re-recording is applied by way of relay switches 64 and cable 65 to a selected one of a plurality of playback-record heads 66 associated with the transfer tape unit 42.

In the system employed, the various playback-record heads 66 of the transfer tape unit are in a normal playback mode. Under control of stepping switch 57, a signal is applied by way of a conductor in cable 67 selectively to energize one of the relays comprising the relay switching unit 64 and to place a selected head or transducer of the transfer tape unit in a record mode. Thus, for example, with the stepping switch 57 arranged to apply information from trace 1 of the field tape to the demodulator 58, the time-correction system 62, and modulator 63, a relay of the unit 64 associated with the first playback-record head of the transfer tape unit is placed in a record mode by a signal from stepping switch 57. All the other playback-record heads of unit 66 are in a playback mode, and their outputs are connected by way of the relay switch unit 64 and conductors of cable 70 to a transfer tape selector switch 71.

Each time the drums 44–46 make one rotation during sequential operation, a step control pulse is applied to the field tape stepping switch 57, to the time-correction stepping switch 61, and selectively to transfer tape stepping switch 71. The control pulses are generated by way of the control unit 50 coupled to the drums 44–46 through channel 72. The control pulses are applied to all the selector or stepping switches 57, 61, 71 by way of channels 73, 74, 75, and 76.

After a predetermined number of seismic traces have been recorded on the transfer tape, the seismic section writing unit 43 and associated apparatus are conditioned to begin writing the seismic section. Prior to this time, the seismic section writing unit has been muted and the transfer tape stepping unit has moved off home position to a first position, but has been there rendered nonresponsive to step control pulses applied from control unit 50 by way of channels 73 and 76. The section writing apparatus is rendered operable at the proper time through action of a preprogramed delay-mute system by removing a muting signal from channel 80. The output from transfer tape selector switch 71, comprising three seismic traces, is applied to FM demodulators 81, 82, and 83. The demodulated traces are mixed in mixing unit 84 and a single mixed trace is applied to writing pen 90 of the section writer unit 43 by way of amplifier 85, switch 87, optionally filter 86 or filter bypass switch 88, and pen amplifier 89.

In usual operations, filtering of the demodulated seismic traces is desirable. The filtering can take place either by way of the filter 59 or the filter 86, or both.

switches are operated, reference will be had to FIGURE 5 for a description of the functions carried out as each of the stepping switches 57, 61, and 71 is moved from home or zero position through the other positions thereof. In the description to follow, a code will be employed to identify the various contacts of the stepping switches. For example, if contact 2, row A, of the field tape stepping switch 57 is to be referred to, it will be denoted as 57–A–2.

It will be recalled that all the playback heads 55 are connected to the field tape stepping switch 57 via cable 56. The conductors carrying the outputs from the field tape playback heads 55 are shown connected to contacts 57–A–1 to 57–A–28 of the field tape selector switch 57. With the stepping switches in home position, the time break may be aligned with the zero reference on the section writing drum by reason of a strap 130 with connects contact 57–A–26 with contact 57–A–0 of the field tape stepping switch. Accordingly, the output representing trace 26 and thus the time break is applied by way of the wiper 131 to contact 57–B–0 and thence by way of all the other contacts in that row which are strapped together to the input of demodulator-amplifier 58 (FIGURE 1). The demodulator-amplifier output is switched to the input of pen amplifier 89 by closing switch 88. After the alignment has been achieved, the seqeunce start button is pressed and now all the wiper arms of the stepping switches are moved to position 1. In position 1, trace 1 of the field tape is applied to the demodulator 58 of FIGURE 1 by way of contacts 57–A–1, wiper arm 131, and the contacts in row B of the field tape stepping switch 57. At the same time, wiper 132 picks up a ground from contact 57–D–1 and applies it by way of contact 57–C–1 to place one of the relay switches 64 (FIGURE 1) in a record mode. Similarly, field traces 2–4 are played back, applied to demodulator 58 (FIGURE 1), time corrected by the system 62, and recorded on the transfer tape.

When the various wipers of stepping switches 57 and 61 attain position 5, a latch relay 135 is energized to condition the transfer tape step switch relay 71 to receive stepping pulses from the drum 44 (FIGURE 6). More particularly, when wiper 136 of field tape stepping switch 57 reaches position 5, it applies a ground by way of conductor 137 to contacts 57–F–5 and 57–E–5 and conductor 138 to one end of the operating coil 135a. The other end of coil 135a is connected to battery 139. The relay is energized to close a circuit through fixed contact 135b. This is the same as placing a shunt across conductors 114 and 115 (FIGURE 6) and now conditions the coil 71a of transfer tape stepping switch 71 to receive step pulses generated upon closure of the switch 120. At the same time, a movable contact 140 of relay 135 (FIGURE 5) is moved up to fixed contact 140a to remove the mute from the demodulators 81, 82, and 83 (FIGURE 1).

With the heads 66 (FIGURE 1) in a playback mode and with the system unmuted, previously recorded seismic traces on the transfer tape are now picked up and applied to the demodulators. This function is performed by contacts and wipers comprising rows C–H of the transfer tape stepping switch 71 (FIGURE 5). More particularly, the output from the first playback head is applied by way of conductor 145 to contact 71–F–1, thence by way of strap 146 to contact 71–D–2, and thence by way of strap 147 to contact 71–D–1. The output from the pickup head associated with trace 2 is applied by way of conductor 148 to contact 71–H–1. With wipers 150, 151, and 152 moved into position 1, it is evident that an output representative of trace 1 will be picked up by wiper 150 and applied by way of a row of strapped contacts with row C to demodulator 81 and that a second representation of the first trace will be picked up by wiper 151 and applied by way of a series of strapped contacts of row E to demodulator 82. A representation of trace 2 will be picked up by wiper 152 and applied by way of a series of strapped contacts with row G to demodulator 83.

A representation of trace 3 is applied by way of conductor 155 to contact 71–H–2 so that when the wipers 150, 151, and 152 have moved to position 2 of the transfer tape stepping switch 71, a single representation of each of traces 1, 2, and 3 is applied, respectively, to the demodulators 81, 82, and 83. The strapping arrangement involving the various contacts of the rows C–H of stepping switch 71 for the purpose of providing, simultaneously, information contained on three traces of the seismogram is well known to those skilled in the art and further description is not believed required for the intermediate operations that take place.

By the time the wiper arms 150, 151, and 152 of stepping switch 71 have reached position 24 and are applying, respectively, to demodulators 81, 82, and 83 a representation of trace 23 and two representations of trace 24, wiper arms 131, 132, etc., of the field tape stepping switch 57 have reached position 28 and the 100-cycle timing signal is being recorded on the transfer tape. Thus, at the time the transfer tape is being completed, so is a particular portion of the seismic section, which portion includes a modified representation of all the seismic information previously recorded on the transfer tape.

INTERLOCK CONTROL

It will be recognized from the description above that the movement of the various wipers comprising the stepping switches must be carefully synchronized in order to attain the desired end result. It would not do, for example, to have a representation of trace 1 being applied to a time-correcting system which, through faulty operation of a stepping switch, is applying a time correction intended for trace 6. Accordingly, there is provided an interlock arrangement which will bring the system to a halt should any of the wiper arms of the stepping switches lose synchronization.

The interlock function is provided by the contacts in rows A–B of stepping switch 71, the contacts in rows G and H of stepping switch 57, and the contacts in rows A and B of time-correction stepping switch 61. Briefly, these contacts, when the armatures of the various stepping switches are in synchronization, provide a ground to maintain an interlock relay 160 (FIGURE 6) in an energized condition. The ground is provided from terminal 161 (FIGURE 5) which is in turn coupled to all 29 contacts in row A of the stepping switch 71. With all the stepping switches in home position or zero position, the ground may be traced to the operating coil of the interlock relay by way of wiper 162, conductor 163, wiper 164, conductor 165, wiper 166, and thence by way of the strapped contacts in row B of the stepping switch 61 to conductor 167. The conductor 167 is connected (FIGURE 6) to one end of the operating coil 160a of interlock relay 160. The other side of the coil is connected to a battery 168.

At the time the step switches are in home position, relay coil 135c of latch relay 135 is energized in order to provide for interlock control during the time that the transfer tape stepping switch 71 is maintained in position 1 and also to maintain the section writing system muted until the wipers of the field tape stepping switch 57 have reached position 5. The operation of latch relay 135 is by way of a circuit which includes battery 139, coil 135c, conductor 170, wiper 132, conductor 171, conductor 137, and thence to ground. Upon energization of the latch relay 135, relay switch 140 is closed on its lower contacts 140b, as illustrated.

As the stepping switches move off home position to position 1, the interlock is provided by way of the strapped contacts in row A of stepping switch 71, wiper 162, and thence by way of conductor 175, contacts 57–G–1 and 57–H–1, conductor 176, and contacts 61–A–1 and 61–B–1.

In general, the filtering can take place any time after demodulation-amplification and before recording of the signal on the transfer tape or, on the other hand, any time before the demodulated-amplified signal from the recorded transfer tape is applied to the writing amplifier 89 of the section writing unit 43. These filters may either be electrical filters or time-domain filters.

In order that the various functions be carried out precisely, it is necessary that the selector switches or stepping switches 57, 61, and 71 be synchronized. An unsynchronized condition immediately is detected by an interlock circuit connecting all three stepping switches as by way, for example, of channels 76, 74, and 75. If for any reason one of the stepping switches fails to respond to the step pulses from the control uint 50, the interlock system will respond immediately to bring the system to a halt and in a muted condition.

Preparatory to the writing of any seismic section, the time break 31 (FIGURE 1) on the field tape is aligned with a zero reference time on the seismic section. Provision is made in the system of the present invention such that with the stepping switches in zero or home position, the time break signal 31 from the field tape is applied by way of the field tape stepping switch 57 (FIGURE 4) to the demodulator-amplifier 58 and appears in demodulated form at the output of the time-correction device 62. When the operator is prepared to time align the field tape with the seismic section, he moves switch 88 to close a circuit with the upper fixed contact so as to apply the time break signal 31 to the pen-writing amplifier 89 by way of conductor 91. The system start switch 49 is closed and the time break signal 31 (FIGURE 1) is written on the section medium by the section writing unit 43. Switch 92, located on the control unit 50, is now closed to bring the system to a stop. The operator will determine the amount of shift necessary between the drums 44 and 46 in order to align the time break with a zero reference. After shifting the drums relative to one another to carry out such alignment, the system is ready for data processing operation.

Referring now to FIGURE 6 and assuming that the tapes have been placed on the field tape drum and the transfer tape drum, that the paper has been placed on the section writing drum, and further that the time break has been aligned with the zero reference point on the paper, the normal data process sequence is initiated by closing sequence start switch 51 which will energize the various stepping switches to bring them off home or zero position. The closure of the sequence start switch 51 applies a ground by way of conductors 101, 102, and 103 to the operating coils of the stepping switches 57, 61, and 71. This ground is a stepping pulse which will cause each of the relays to move off home position to relay position 1.

Each of the stepping switches is a standard type, including the usual relay interrupter switch which opens and closes in response to movement of the relay armature. Interrupter switches 104, 105, and 106 are associated, respectively, with stepping switches 57, 61, and 71.

The movement of the stepping switches from home to the first position now renders the stepping switches nonresponsive to further closing of the sequence start switch 51 and makes them responsive to step pulses generated upon each rotation of the drum 44 by way of control unit 50. This operation occurs in the following manner.

The initial ground or step pulse is applied to step switch 57 by way of the sequence start switch 51, conductors 101 and 102 to the lower contact of a cam-operated switch 107, and thence by way of interrupter switch 104 to one end of operating coil 57a. The opposite end of coil 57a is connected to a battery 108. When the step switch 57 responds, a cam 107a is rotated to open the aforementioned circuit and to close a circuit to conductor 127 to receive stepping pulses generated by rotation of the drum 44.

The time-correction stepping switch 61 similarly responds to the sequence start pulse as by way of switch 51, conductors 101, 102, and 103 to move its related contact wipers from home position to position 1 and thereafter becomes nonresponsive to further closures of the switch 51. The time-correction stepping switch 61 has associated therewith a cam-operated switch 110, having a cam 110a mechanically coupled to the armature which may be the rotating element of the stepping switch. In the illustrated position, the operating coil 61a will be energized by closure of the sequence start switch 51. Rotation of the cam 110a will interrupt this circuit and close a circuit as by movement of the movable contact to engage the upper fixed contact of switch 110 and thereby to close a circuit for receipt of step pulses generated by rotation of the drum 44.

The operating circuit arrangement for the transfer tape stepping switch 71 is different. As a condition for proper sequential operation, the stepping switch 71 is required to move from a home or zero position to a first position or position 1 and thereafter be nonresponsive to control pulses or step pulses produced by rotation of the drum 24 until such time as the other stepping switches have moved to a predetermined position. In the example used, the stepping switch relay will be maintained nonresponsive until after the field tape stepping switch has reached position 5. The delay in the operation of the transfer tape stepping switch provides the delayed-mix feature of this invention. Accordingly, the transfer tape stepping switch 71 receives a step pulse by closure of the sequence start switch 51 which is applied by way of conductors 101 and 111 to the lower fixed contact of cam-operated switch 112. The pulse is then applied by way of relay interrupter switch 106 and a second cam-operated switch 113 to the operating coil 71a of the stepping switch 71. As the stepping switch 71 steps from home position to position 1, cam 112a, mechanically coupled to the rotating element of the stepping switch 71, rotates to move the movable contact associated therewith to a closed position with the upper fixed contact of switch 112. The circuit used for the initial step is interrupted by the rotation of the cam 113a of switch 113. The relay 71 is now conditioned to receive step pulses generated by rotation of the drum 44 when a circuit, including conductors 114 and 115, is closed.

System start switch 49 is closed to energize one coil 95 of a main stop relay 96 to in turn energize drum motor 97 and to condition the section writing system for response to a later-generated unmuting signal. The main stop relay, which is a latch relay of either the mechanical or the magnetic type, is energized by way of a circuit which may be traced from battery 98, coil 95, system start switch 49, and thence to ground. The motor 97 is energized from the source of power represented by terminals 48 by way of the closure of contacts 99 of the main stop relay 96. The muting system is preconditioned for the removal at the proper time of the automatic mute by opening contacts 100 of the main stop relay 96 and thus removing one of the grounds from the mute system.

The drum 44, mechanically coupled to the motor 97 by way of shaft 47, begins rotation in a counterclockwise direction. Step pulses are generated by the rotation of drum 44 which carries a raised portion 44a for closing switch 120 each time the drum makes one rotation. The closure of switch 120 completes a circuit, applying a ground to the operating coil of stepping switches 57, 61 and to 71 when the conditions for the closing of a circuit, including conductors 114 and 115, have been satisfied. This circuit may be traced from the ground conneciton 121, thence by way of conductor 122 to the movable contact of the switch 120. The circuit is completed through the fixed contact of the switch 120, switch 123, and conductors 124, 125, 126, and 127.

Now that the system is in operation and an understanding is had of the manner in which the various stepping As the field tape stepping switch 57 and the time-correction stepping switch 61 move on to position 2, an interlock control or ground is applied by way of the wiper arm 162 which is maintained in position 1, thence by way of conductor 177, the lower fixed contact 140b of relay switch 140, conductors 178 and 179, and diode 180 to contact 57–G–2. As the stepping switches 57 and 61 now move successively to positions 3 and 4, the interlock control is applied by way of diodes 181 and 182 by way of the aforementioned circuit, respectively, to contacts 57–G–3 and 57–G–4.

When the stepping switches 57 and 61 have reached position 5, the latch relay 135 is again energized, this time by way of coil 135a by reason of wiper 136 bridging contacts 57–E–5 and 57–F–5 in the manner previously described. Switch 140 as a result is closed on its contact 140a to remove the mute signal from conductor 178, and conductors 114 and 115 are bridged by closure of relay switch 135b to prepare the transfer tape stepping switch 171 for response to the next step pulse from the drum 44 (FIGURE 6). The interlock is still effective by reason of the connection of 71–B–1 through switch 140 and its contact 140a to conductor 189 and contact 57–G–5 of field tape stepping switch 57. This particular interlocking scheme assures that the delay control relay 135 has been correctly reset for normal sequential operations. If it malfunctions and does not reset, the machine stops.

Now as the stepping switches are moved into the next position, the stepping switches 57 and 61 moving to position 6 and the stepping switch 71 moving to position 2, the interlock is maintained by application of a ground by way of conductor 186 which connects contacts 71–B–2 and 57–G–6. When the stepping switch 71 is in position 3 and stepping switches 57 and 61 in position 7, the interlock is provided by way of conductor 187. Likewise, interlock is provided by conductors 188 and 189, respectively, from contacts 71–B–4 and 71–B–5 when the stepping switches 57 and 61 are, respectively, in positions 8 and 9. The conductors 186, 187, 188, and 189 are multiplied every four contacts along row B of stepping switch 71 and along every four contacts along row G of stepping switch 57 to avoid the necessity and the bulkiness of individual wires or conductors. In the operation of such a system, it is safe to have the multiple arrangement, for it would be rare indeed that one stepping switch would move five positions while another stepping switch moves only one.

Should the wipers of the stepping switches get out of synchronization, the ground is removed from conductor 167 and interlock relay 160 (FIGURE 6) is de-energized to mute the system and bring the drum 44 to a stop. More particularly, when interlock relay 160 is de-energized, coil 195 of the main stop relay 96 is connected in circuit with battery 98 to unlatch the relay and to remove power from the motor 97 by opening contacts 99. At the same time, contacts 100 are closed to apply a ground to the muting circuit. The main stop relay 96 is unlatched by completing a circuit through relay contacts 160b which applies a ground by way of conductor 196, contacts 160b, and conductors 197 and 198 to one side of the coil 195. The other side of the coil is connected to the positive side of battery 98. The negative side of the battery 98 is connected to ground.

MUTING SYSTEM

It is essential that selected portions of the system be maintained in a muted or nonresponsive state during certain operations of the system. Thus, for example, the demodulators 81, 82, and 83 and elements associated with the writing pen 90 (FIGURE 4) are held in a muted state until such time as the seismic section is to be written. It will be recalled that this time, in accordance with the example given above, occurs when the field tape stepping switch 57 attains stepping switch positions 5.

When portions 5 is attained, a mixing takes place of two representations of trace 1 and one representation of trace 2 which previously have been recorded on the transfer tape.

The muting function is performed through the operation of mute relay 200 (FIGURE 7). The mute relay 200 includes an operating coil 201 having one end connected to battery 202 and is responsive to a ground being applied to conductor 203 to actuate various contacts associated therewith in order to mute selected portions of the system. When a ground is applied to conductor 203, the relay is actuated to perform the following operation.

(1) Movable relay contact 204 is pulled down to apply a ground to a pen lift relay 205. The other side of the pen lift relay is connected to battery 206. The operation of the relay 205 lifts the writing pen 90 (FIGURE 1) from the seismic section medium.

(2) Relay contact 207 is pulled down to remove from conductor 80 B+ and thus render amplifier 85 and the demodulators 81, 82, and 83 inoperative.

(3) Movable relay contact 208 is pulled down to disconnect pen step relay 209 from further step pulses which originate by rotation of the drum (FIGURE 6). While a detailed showing has not been made of the manner in which pen step pulses are generated, the manner of doing so is not claimed as novel herein and is well understood by those skilled in the art.

The mute relay 200 is energized whenever any one of a number of conditions takes place in the operation of the overall system. Included in the condition are the time period which previously has been referred to as delayed mix or the period during which the field tape stepping switch is moving from position 1 to position 5. A second condition which causes the energization of the mute relay is the loss of interlock between the stepping switches.

Referring to FIGURE 5 and assuming that the stepping switches have been moved into position 1, it will be recalled that the latch relay 135 has been energized through its upper coil 135c to apply a ground from switch contact 71–B–1 and conductor 177 to conductor 178. This ground in turn is applied by way of conductors 210 and 211 (FIGURE 7) to the operating coil 201 of the mute relay. The ground is continued until the field tape stepping switch 57 has reached position 5. At this time, the latch relay 135 is operated through its lower coil 135a to release the switch 140 and disconnect conductor 178 from the ground connection. The mute relay is de-energized and the section writer is now conditioned to write a mix of two representations of trace 1 and a single representation of trace 2.

Referring now to FIGURE 6 and assuming that the stepping switches have lost synchronization, the interlock relay 160 will be de-energized, at which time a ground will be applied by way of conductor 196 and relay switch 160c to conductor 212. The mute relay 200 is thereby energized to carry out the above-described muting functions.

Closing of relay switch 100 through energization of coil 195 of main stop relay 96 also will apply a ground to conductor 212 and energize the mute relay 200.

The mute relay 200 is also responsive through operation of a programed START-STOP system which is under the control of the operator.

PROGRAMED START-STOP

There are times when it is desirable to limit the information being transferred from the transfer tape to the seismic section to a preselected number of seismic traces. This can occur, for example, where one of the traces, such as trace 1, is known to be noisy or in another respect contains information of little or no value. Under such conditions, it is desirable to avoid mixing that trace with the other seismic traces in the preparation of the seismic section. In FIGURE 7 there is disclosed an arrangement for programing the start and stop of the section write. The arrangement includes 24 start switches, 215–1 through 215–24, inclusive, and 24 stop switches, 216–1 through 216–24, inclusive. These switches are also shown on the control unit 50 of FIGURE 4.

Each of the switches 215 (FIGURE 7) may be of the double throw-single pole type with the lower contacts thereof strapped together, as by way of straps 220, and connected by conductor 221 to the operating coil of the mute relay 200. The movement of any one of the switches 215 to a lower position will cause the system to be muted until the transfer tape stepping switch 71 has been moved to a position associated with that switch. Thus, for example, if switch 215–3 is moved to its dotted-line position, a ground will be applied from terminal 222 connected to the strapped rows of contacts in row I of stepping switch 71 to the operating coil of the mute relay. This ground will be maintained until the wiper 223 of stepping switch 71 has moved to position 3. The operation is as follows.

With the wiper 223 in position 1, a ground is applied from terminal 222 by way of the straps in row I and wiper 223 to conductor 224. The ground is coupled through diode 225, strap 226, the movable contact of start switch 215–2, strap 227, the movable contact of start switch 215–3, and thence to the strapped lower contacts of the start switches 215. Similarly, when the wiper reaches position 2 the ground is applied to conductor 230, thence by way of conductor 231 and diode 232 to the lower strap contacts of the start switches 215. Thus, it is seen that until the transfer tape stepping switch 71 reaches position 3, the transfer tape playback system is muted and that the seismic section writer will not begin its operations until the stepping switch 71 has reached position 3. At this time, the ground will be removed from conductor 221 and from the mute relay, and the section writer will write as its first trace a combination of traces 2, 3, and 4.

In practice, the output of demodulator-amplifier handling the seismic data from trace 2 (undesired trace) is manually muted by turning gain control knob (not shown) to "no output" setting.

Should it be desired to stop the section writer whenever the transfer tape stepping switch has reached a predetermined position and thus eliminate from the seismic section one of the later traces, for example, the trace 24 or earlier traces, the operator will employ one of the stop switches 216. Each of the stop switches 215 may be of the single pole-double throw type having their lower contacts multipled together by way of straps 235 and connected to stop relay 240 (FIGURE 6) by way of conductor 241.

Let us assume that the operator wishes to stop operations when the transfer tape stepping switch has reached position 22. In such event, he will move stop switch 216–22 to a lower position, as illustrated in dotted lines. Now, when the wiper 223 (FIGURE 7) of stepping switch 71 reaches position 22, there will be applied a ground to conductor 242 which will be coupled by way of diode 243 through switch 216–22 to the strapped lower contacts of the stop switches. The application of a ground to the operating coil 240a of the stop relay energizes the relay from battery 245 immediately upon the initiation of writing a combination of traces 21, 22, and 23, and in the following manner.

The stepping switches move into position 22 upon closure of contacts 120 which generates the step pulse. With relay switch 246 of the stop relay 240 closed, the system will come to a stop as soon as the drum rotates to close cam-operated stop switch 247. The closure of switch 247 applies a ground to conductor 248 which is applied through the closed switch 246 to energize the main stop relay 96 by way of coil 195 from battery 98. The main stop relay 96 is thereby made effective to close relay switch 100 and to open relay switch 99. The closure of relay switch 100 immediately applies a ground to the mute relay 200 (FIGURE 7), and the opening of relay switch 99 opens the energizing circuit for the motor 97 and brings the drum 44 to a stop.

In addition to the above operations, the relay switch 123 of stop relay 240 is opened to prevent further pulses being applied to the stepping switches 57, 61, and 71.

RECORD-PLAYBACK RELAY SWITCHES

Referring now to FIGURE 8, there is illustrated in greater detail the relationship between the record-playback relay switches 64 and the transfer tape record-playback heads 66. The function of each of the relays 64 is to place the transfer tape record-playback heads and associated circuits from a normal playback mode to a record mode. It will be recalled from the description of the stepping switches in FIGURE 5 that a control pulse is generated each time the wiper 132 of the stepping switch 57 moves from positions 1–28 along the contacts of rows C and D. Each of the relays 64 of FIGURE 8 responds to a control pulse applied by way of a conductor associated therewith and forming the cable 67. Thus, for example, with the stepping switches in position 1, a control pulse is applied to the relay 64–1 and the output from the modulator-amplifier 63 is applied by way of conductor 63a through suitable switching in the relay to the record-playback head 66–1. With the stepping switches in position 2, a suitable control pulse is applied to the operating coil of the relay switch 64–2 to place the relay in a record mode; and with all other relays in a playback mode, the output from the modulator-amplifier 63 is applied by way of suitable switching in the relay 64–2 to the transfer tape record-playback head 66–2.

The outputs from all the nonactivated record-playback heads normally are applied by way of the relay switches 64 to conductors comprising the cable 70 whose opposite ends are connected to related contacts along row H of the stepping switch 71 (FIGURE 5).

All the relay switches 64 are identical and are of the type shown in FIGURE 9. For purpose of discussion, this relay switch will be referred to as the one associated with the first trace or relay switch 64–1. The relay switch 64–1 is constructed using two relays of the double pole-double throw type with their operating coils connected in parallel. This relay switching arrangement was designed to provide a means of changing a particular magnetic head from a normal playback function to a recording function while providing excellent signal isolation characteristics. This isolation is necessary to prevent the comparatively high level record signal present during recording operations from cross feeding into the low level playback system during the transfer tape playback operation. As illustrated, the relay switch 64–1 is in the normal playback mode with the output from the pickup head 66–1 being applied to conductor 145 which is in turn connected to contact 71–F–1 of the stepping switch 71 (FIGURE 5). The output is applied to conductor 145 by way of movable contact 250 and upper fixed contact 251. The opposite end of the record-playback head 66–1 is connected to ground by way of a circuit which includes conductor 252, upper fixed contact 253 of the relay switch 64–1, movable contact 254, and conductor 255.

It will be recalled from the description of FIGURE 8 that all the relay switches have their recording signal inputs connected in parallel. The inputs are connected through conductor 63a to the output of the modulator-amplifier 63 of FIGURE 1. Therefore, the output from the modulator-amplifier 63 would appear on conductor 63a of FIGURE 9. In order to avoid cross feed from this high level recording signal and undesirable mixing of signals, a second set of contacts which include the movable contacts 255 and 256 are provided which serve to ground the lower fixed contact 257 and thus avoid any transmission of unwanted recording signal which might otherwise be coupled across the opening between contacts 250 and 257 onto the output from the playback head.

When the stepping switches move into position 1, a control signal is applied by way of conductor 260 forming part of the cable 67 (FIGURE 5) to energize the operating coils 261 and 262 of the relay switch 64–1. The control pulse is a ground which completes a circuit through the operating coils 261, 262 to battery 263. The system is now in a record mode and the output from the modulator-amplifier would be recorded by way of conductor 63a to the record-playback head 66–1 through the movable contacts 250, 256 of the relay switch 64–1, which contacts have been moved to a lower position. At the same time, conductor 145, which normally carries output signals to the stepping switch 71, is grounded, preventing the high level recording signal from being transmitted to the contacts of rows H, F, and D of this stepping switch. The ground is effected by movable contact 254 engaging fixed contact 264. A ground is restored for the opposite side of the pickup head 66–1 connected to conductor 252 by closure of movable contact 255 upon fixed contact 265 which is connected to ground by way of conductor 266.

MANUAL STEP

Provision is made in the present system for an operator to manually step the stepping switches 57, 61, and 71 to any desired position to begin the sequential record-delay mix playback operation while maintaining their synchronous and interlocked condition. Such operation is desirable when the first trace to be played back from the field tape is some trace other than trace 1.

The circuit for carrying out manual step operation is illustrated in FIGURE 6 wherein the closure of hand-operated switch 270 applies a ground to one end of the operating coils of the various relay step switches to effect movement thereof. For example, the upper end of the operating coil 57a of switch 57 is connected by way of conductor 271 and isolating diode 272 to the manual step switch 270.

It will be noted that the connection to the relay coil is at a point between the switch 104 and the coil itself. The connection is made at this point in order to assure one step of the relay switch for each closure of the manual step switch 270. The relay step switches are fast operating with the interrupter switch 104 capable of opening and closing and thus effecting a step in less than 50 milliseconds. Therefore, a careless operator who holds the switch 270 closed for too long a period of time may find that he has stepped by or passed the desired stopping point.

The connections for applying a manual step pulse to the operating coil 61a of relay 61 are identical to those for the relay 57. However, modification is required to manually step the transfer tape stepping switch relay 71. It will be recalled that stepping switch 71 moves initially from home position to relay position 1 and then holds until the other stepping switches have reached position 5. Thereafter, all the stepping switches move together. Accordingly, provision is made in the manual step mode to step the transfer tape stepping switch relay 71 off home position, hold it there for four pulses of the manual step switch 270, and then render it responsive to further closures of the manual step switch. The first closure of the manual step switch 270 applies a ground to complete a circuit to energize the operating coil 71a of transfer tape stepping switch 71 from battery 71c. This ground is applied by way of isolating diode 280, conductor 281, contacts of the cam-operated switch 113, and thence to one side of the operating coil 71a. As the stepping switch moves to position 1, cam 113a is rotated to open contacts of the switch 113 and thereby prevent further pulses from the closure of manual step switch 270 from being effective to energize the operating coil 71a. When the other stepping switches have reached position 5, the latch relay 135 (FIGURE 5) closes its contacts 135b and now further pulses due to closure of manual step switch 270 can be applied to the operating coil 71a by way of conductors 114 and 115.

By this circuit arrangement in stepping switch 71, the delay mix relationship between the various stepping switches is maintained so that section writing operations may begin without further adjustment to the stepping switches or restoration of the interlock circuit.

A suitable dynamic time corrector or normal moveout correction system which sequentially time corrects seismic traces is disclosed and claimed in U.S. Patent 3,092,805, issued to G. D. Koeijmans.

Now that details of the system embodying the present invention have been set forth, modifications will become apparent to those skilled in the art and it is intended to cover such modifications which fall within the scope of the appended claims.

What is claimed is:

1. A method of processing seismic data recorded as traces in phonographically reproducible form to produce a time-corrected representation thereof and a second representation differing in character from the time-corrected representation comprising the steps of
   (a) sequentially and individually reproducing each seismic trace,
   (b) time correcting each reproduced seismic trace for static and dynamic time errors,
   (c) re-recording on a recording medium sequentially each time corrected trace,
   (d) while re-recording another time corrected trace on the same medium, sequentially and simultaneously reproducing from the medium at least one previously re-recorded trace and modifying the character of said trace, and
   (e) recording on another medium the modified trace to produce a portion of a seismic section while continuing said re-recording.

2. A method of processing seismic data recorded as traces in phonographically reproducible form to produce a time-corrected representation thereof and a second representation differing in character from the time-corrected representation comprising the steps of
   (a) sequentially reproducing each seismic trace,
   (b) time correcting each reproduced seismic trace for static and dynamic time errors,
   (c) re-recording sequentially each time corrected trace,
   (d) while re-recording another time corrected trace, sequentially and simultaneously reproducing at least two previously re-recorded traces,
   (e) compositing said aforementioned traces to produce another trace differing in character from any one of said time corrected traces, and
   (f) recording on another medium the trace produced by said compositing to produce a portion of a seismic section while continuing said re-recording.

3. A method of processing seismic data recorded as traces in phonographically reproducible form to produce a time-corrected representation thereof and a second representation differing in character from the time-corrected representation comprising the steps of
   (a) sequentially reproducing each seismic trace,
   (b) time correcting each reproduced seismic trace for static and dynamic time errors,
   (c) re-recording sequentially each time-corrected trace,
   (d) while re-recording another time-corrected trace, sequentially and simultaneously reproducing a plurality of preselected previously re-recorded traces,
   (e) compositing said plurality of traces with a ⅔ mix to produce a composite trace, and
   (f) recording on another medium the composite trace to produce a portion of a seismic section while continuing said re-recording.

4. A system for processing seismic data recorded as traces in phonographically reproducible form to produce a time-corrected representation thereof and a second representation differing in character from the time-corrected representation comprising
(a) means for sequentially reproducing each seismic trace,
(b) a time correcting means,
(c) means for applying sequentially each reproduced seismic trace to said time correcting means for the removal of static and dynamic time errors,
(d) means for re-recording sequentially each time corrected trace,
(e) means operable following the re-recording of a predetermined number of time corrected seismic traces to begin sequentially reproducing at least one previously re-recorded time corrected trace, while additional time-corrected traces are being re-recorded,
(f) means for modifying the character of said reproduced time corrected trace,
(g) a seismic section recorder, and
(h) means for applying the output of said modifying means to said recorder to record said modified trace in production of a portion of a seismic section.

5. The system of claim 4 wherein said means for reproducing time-corrected seismic traces includes means for reproducing simultaneously a plurality of preselected previously re-recorded and time-corrected traces, and wherein said modifying means comprises an arrangement for compositing said plurality of time-corrected traces to produce a single composited trace.

6. In a system for data processing seismic data recorded as traces in phonographically reproducible form and including a field tape playback system, a transfer tape playback system, and a seismic section writer the combination therewith of a system for simultaneously playing back signals from the field tape, recording time-corrected representations of the played back traces on the transfer type system and for recording a different representation of the traces earlier recorded on the transfer tape on a medium associated with the section writing system comprising
(a) selector means for sequentially selecting individual seismic traces from the field tape system,
(b) a time correction system,
(c) means for applying said selected traces to said time correction system for the removal of static and dynamic time errors,
(d) means responsive to positions of said selector means for applying said time corrected traces for recording by the transfer tape system,
(e) means responsive to the attainment of a predetermined position by said selector means for reproducing simultaneously a plurality of time-corrected traces previously recorded by the transfer tape system while continuing the application of additional time-corrected traces to the transfer tape system,
(f) means for compositing said time-corrected traces to produce a single composited trace, and (g) means for applying said composited trace to the section writer.

7. The combination of claim 6 in which there is provided a muting means responsive to positions assumed by said selector means for maintaining the seismic section writer non-responsive until said selector means attains said predetermined position.

8. The combination of claim 6 in which said means for simultaneously reproducing traces from the transfer tape includes a multi-bank selector switch, means for moving said selector switch and said selector means from position to position synchronously in accordance with a predetermined porgram, and means for detecting nonsynchronism between operations of said selector switch and said selector means for bringing the playback and data processing system to a stop.

9. The combination of claim 6 in which there is included means for muting the section writer and in which said muting means is responsive to attainment by said selector means of a predetermined position for unmuting the section writer.

10. The combination of claim 6 in which there is included means for starting the writing of a seismic section wth a preselected trace from the transfer tape system, muting means for rendering said section writer nonresponsive to seismic signals corresponding to traces occurring earlier in time than said preselected trace, and means responsive to the attainment by said selector switch of a position corresponding to said preselected trace for generating a signal terminating operation of said muting means and rendering the section writer responsive to seismic signals.

11. The combination of claim 6 in which the transfer tape system includes a plurality of record-playback means, said means being in a normal playback mode, and means responsive to positions of said selector means for individually and sequentially transferring said record-playback means to a record mode.

12. The combination of claim 6 in which said selector switch includes means for stepping said switch from position to position, means for generating step pulses for application to said stepping means, and means for rendering said stepping means nonresponsive to said stepping pulses until said selector means attains a predetermined position.

References Cited by the Examiner

UNITED STATES PATENTS

| | | | |
|---|---|---|---|
| 2,767,389 | 10/1956 | McCollum | 340—15.5 |
| 2,806,545 | 9/1957 | Schempf | 340—15.5 |
| 2,879,860 | 3/1959 | Tilley | 181—.5 |
| 2,888,663 | 5/1959 | Blake et al. | 340—15.5 |
| 3,040,294 | 6/1962 | Lee et al. | 340—15.5 |

BENJAMIN A. BORCHELT, *Primary Examiner.*

R. M. SKOLNIK, *Assistant Examiner.*